United States Patent [19]
Hunt

[11] 3,899,644
[45] Aug. 12, 1975

[54] AC/DC-MONITORING TELEPHONE LINE RINGING VOLTAGE DETECTOR

[75] Inventor: Theodore R. Hunt, Aloha, Oreg.

[73] Assignee: Data Time, Inc., Portland, Oreg.

[22] Filed: June 19, 1974

[21] Appl. No.: 480,613

[52] U.S. Cl. .......... 179/84 R
[51] Int. Cl. .......... H04q 9/00
[58] Field of Search .... 179/84 T, 84 R, 84 A, 81 R, 179/18 HB, 18 F, 18 FA

[56] References Cited

UNITED STATES PATENTS

| | | | |
|---|---|---|---|
| 3,175,042 | 3/1965 | Baldwin | 179/18 FA |
| 3,321,583 | 5/1967 | Maul | 179/18 FA |
| 3,653,018 | 3/1972 | Budrys | 340/248 P |
| 3,746,798 | 7/1973 | Thomas | 179/18 HB |
| 3,781,571 | 12/1973 | Lord | 307/235 R |

*Primary Examiner*—Kathleen H. Claffy
*Assistant Examiner*—Joseph Popek
*Attorney, Agent, or Firm*—Kolisch, Hartwell, Dickinson & Stuart

[57] ABSTRACT

Apparatus for monitoring both the AC and the DC voltage conditions between conductors in a telephone line for the purpose of discerning the presence of AC ringing voltage in the line. The proposed apparatus takes advantage of the fact that valid ringing voltage occurs only under circumstances with a called telephone set in an "on-hook" condition, wherein there is always a considerably larger DC voltage between the usual ring and tip conductors than there is with the set in an "off-hook" condition. Accordingly, the desired monitoring is accomplished through circuitry which looks for the simultaneous presence in a telephone line of AC along with DC of the proper level (which is indicative of an on-hook condition in a connected set).

3 Claims, 1 Drawing Figure

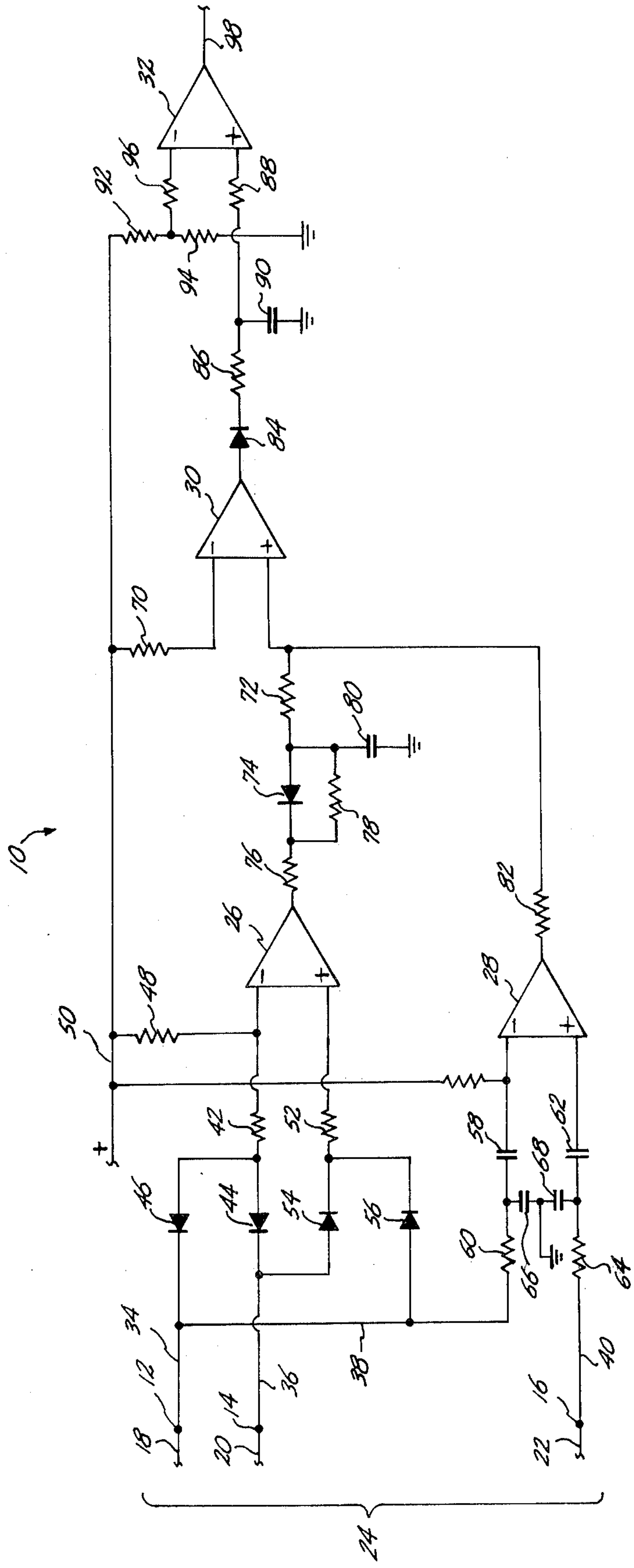

AC/DC-MONITORING TELEPHONE LINE RINGING VOLTAGE DETECTOR

BACKGROUND AND SUMMARY OF THE INVENTION

This invention pertains to apparatus for detecting the presence of AC ringing voltage in a telephone line. More particularly, it pertains to such apparatus which discerns the presence of valid ringing voltage through looking for the simultaneous existence in the line of certain AC and DC voltage conditions.

Various types of telephone-line-connected apparatus, such as telephone answering devices, are intended to respond and perform some function on the receipt at a subscriber's telephone set of an incoming call which is signaled by the presence of AC ringing voltage in the line. Various techniques have been used in the past to detect the presence of valid ringing voltage, and the present invention proposes yet another technique, which is unique, and which is believed to offer a number of advantages over prior art approaches.

The proposed invention rests on the concept that ringing voltage in a telephone line occurs only under circumstances when the called telephone set is in an on-hook condition. And, with a set in an on-hook condition, substantially the only appreciable AC voltage which will ever exist in the line will be AC ringing voltage. In virtually all telephone systems in this country, there normally exists a DC voltage between the ring and tip conductors in a telephone line, which voltage changes in magnitude at the location of a connected telephone set when the set is switched from an on-hook to an off-hook condition, or vice versa. Substantially always, a higher DC voltage exists with a set in an on-hook condition than with the set in an off-hook condition. The polarity may differ from system to system.

Thus, the instant invention contemplates circuitry which looks for the simultaneous existence in the appropriate conductors in a telephone line of an AC voltage, along with a DC voltage of the proper level indicative of an on-hook condition in a connected telephone set. When this simultaneity occurs, the apparatus of the invention determines that the AC voltage then existing is valid AC ringing voltage, and so indicates. Other AC voltages which in the past have had to be filtered in order to distinguish them from ringing voltage, such as voltages generated by dialing or by a busy tone, etc., always occur under circumstances with a telephone set in an off-hook condition. These AC voltages are disregarded in the apparatus of the invention by virtue of its noting the then-lower DC voltage condition between ring and tip conductors.

According to a preferred embodiment of the invention, the proposed apparatus includes separate AC and DC inputs—the former being adapted for connection to those conductors in a telephone line which present AC ringing voltage (e.g., the ring and tip conductors in a two-wire connection, and the ring and ground conductors in a three-wire connection), and the latter being adapted for connection to those conductors in a telephone line wherein DC indicative of the on-hook/off-hook condition of a connected telephone set exists (e.g., the ring and tip conductors in both two-wire and three-wire connections). Connected to the DC input is a DC voltage level determiner, or monitor, which produces a positive indication whether or not the connected telephone set is in an on-hook or an off-hook condition—such being done, of course, through sensing the magnitude of DC voltage between ring and tip conductors. A conjunction indicating circuit is connected both to the AC input and to the DC voltage level determiner for detecting simultaneity of the type discussed above. When such simultaneity is found, an operative output signal is produced by an output circuit in the apparatus, which signal thereby indicates the existence of valid ringing voltage.

Several of the important features of the proposed apparatus are that it is extremely simple in construction, can be manufactured at relatively little cost, and is quite reliable in its ability to distinguish ringing voltage. Another important feature is that it identifies ringing voltage through searching for the simultaneous occurrence of certain inherent conditions in a telephone line, which conditions uniquely indicate the presence of such voltage.

These and other objects and advantages attained by the invention will become more fully apparent as the description which now follows is read in conjunction with the accompanying drawing.

DESCRIPTION OF THE DRAWING

The single drawing FIGURE is a circuit diagram, partly in block form, illustrating details of construction of the apparatus of the present invention.

DETAILED DESCRIPTION OF THE INVENTION

Turning now to the drawing, indicated generally at 10 is a ringing voltage detector constructed in accordance with the present invention. Detector 10 is adapted for connection to the usual telephone line conductors (e.g., the customary ring, tip and ground conductors) regardless of whether these conductors are available for two-wire or three-wire operation. As is well understood, in a two-wire operation, the tip and ground conductors are connected together. In the particular arrangement shown in the drawing, detector 10 is connected for three-wire operation, and includes terminals 12, 14, 16 which are connected, respectively, to ring conductor 18, tip conductor 20, and ground conductor 22 in a telephone line indicated by bracket 24.

Included within the detector are four solid-state integrated-circuit-type operational amplifiers indicated at 26, 28, 30, 32. While these amplifiers may in fact be separate components, there are available several commercial products which include all of these amplifiers in a single package. Such a package is used in detector 10, and is made by National Semiconductor, Inc. as their device identified as LM 3900. However, for the purpose of explaining the circuitry of detector 10, the four operational amplifiers are shown in the drawing as separate units.

Functioning as a DC input in the detector are the two conductors shown at 34, 36—these two conductors being connected to terminals 12, 14, respectively. Functioning as an AC input in the detector are the two conductors shown at 38, 40. Conductor 38 connects with conductor 34, and conductor 40 connects with terminal 16. Conductors 34, 36, 38, 40 collectively constitute input means herein.

Amplifier 26 performs in the detector as a DC voltage level monitor, or determiner. Its inverting input is coupled through a resistor 42 and a diode 44 to conductor 36, and in addition, is coupled through resistor 42 and a diode 46 to conductor 34. Diodes 44, 46 are poled to conduct away from resistor 42. A resistor 48 connects the inverting input to a positive voltage supply conductor 50. The noninverting input of amplifier 26 couples through a resistor 52 and a diode 54 with conductor 36. A diode 56 interconnects conductor 38 and the junction between resistor 52 and diode 54. Diodes 54, 56 are poled to conduct toward resistor 52.

The inverting input of amplifier 26 is biased herein in such a manner that with the DC voltage between conductors 34, 36 (and hence between ring and tip conductors 18, 20) less than about 18-volts (regardless of the polarity of this voltage) the output of the amplifier is at substantially ground potential. However, with the voltage between conductors 34, 36 above about 18-volts, the output of the amplifier switches to some positive voltage, for example about +12 volts which is the case in detector 10. Thus, amplifier 26 performs in the detector to determine whether or not the voltage between conductors 34, 36 is above or below 18 volts.

18 volts has been chosen herein as a convenient voltage for distinguishing on-hook and off-hook conditions in a telephone set connected to line 24. With a three-wire connection used, and with a connected telephone set in an on-hook condition in most U.S. telephone systems, the DC voltage between the ring and tip conductors will typically be about 50 volts. When the telephone set is switched into an off-hook condition, this DC voltage will typically be about 9 volts. Thus, so long as a connected telephone set is in an on-hook condition, a positive voltage of about +12 volts exists at the output of amplifier 26. With the telephone set in an off-hook condition, the output voltage of the amplifier is at substantially ground potential.

Operational amplifier 28 functions as an AC voltage amplifier, or monitor, in the detector. Its inverting input is connected through a capacitor 58 and a resistor 60 to conductor 38. Similarly, its noninverting input is connected through a capacitor 62 and a resistor 64 to conductor 40. Series-connected capacitors 66, 68 (the junction between which is grounded) interconnect the junction between capacitor 58 and resistor 60 and the junction between capacitor 62 and resistor 64.

AC ringing voltage in line 24 will occur between the ring and ground conductors, and hence between conductors 38, 40. This voltage, when it occurs, might typically have an RMS magnitude of 40–100 volts. When such a voltage occurs, the voltage at the output of amplifier 28 switches or alternates between about ground potential and about +12 volts, at the frequency of the ringing voltage (typically 20 Hz).

Amplifier 30 in the detector constitutes a conjunction determiner, or simultaneity circuit. Its inverting input is connected through a resistor 70 to supply conductor 50. Interconnecting its noninverting input and the output of amplifier 26 are a resistor 72, a diode 74 and another resistor 76—all connected in series. Diode 74 is poled to conduct toward the output of amplifier 26. Connected across diode 74 is a resistor 78, and connecting the junction between diode 74 and resistor 72 to ground is a capacitor 80. A resistor 82 connects the output of amplifier 28 and the noninverting input of amplifier 30.

With the voltage on the noninverting input of amplifier 30 below about +18 volts, the output of the amplifier is at substantially ground potential. When such voltage exceeds +18 volts, the output voltage switches to about +12 volts.

Completing a description of what is shown in the drawing, the output of amplifier 30 is connected to the noninverting input of amplifier 32 through a series circuit including a diode 84 and a pair of resistors 86, 88. Diode 84 is poled to conduct away from the output of amplifier 30. Grounding the junction between resistors 86, 88 is a capacitor 90. Biasing the inverting input of amplifier 32 is a voltage divider including resistors 92, 94—the junction between which is connected through a resistor 96 to the inverting input. Resistors 92, 94 extend between supply conductor 50 and ground. The output of amplifier 32 is connected to an output conductor 98.

Amplifier 32 constitutes herein an output means for producing on conductor 98 an output signal indicative of the presence of valid ringing voltage. So long as the output of amplifier 30 is at ground potential, so also is the output of amplifier 32. When, however, the output of amplifier 30 switches to +12 volts, then, and after a time delay of about 0.3-seconds (introduced by resistor 86 and capacitor 90), a like change occurs on conductor 98. This time delay is provided in order to prevent detector 10 from inadvertently identifying as valid ringing voltage, a spurious transient voltage condition which might exist in a telephone line.

Explaining now how detector 10 performs, and assuming that a conventional telephone set (not shown) is connected to conductors 18, 20, 22, whenever this set is placed in an off-hook condition, the DC voltage between conductors 34, 36 drops from 50 volts, below 18 volts, and specifically to about 9 volts DC. Under these circumstances, and as has been discussed briefly earlier, the output of amplifier 26 is at substantially ground potential. This being the case, any charge which may have accumulated in capacitor 80 is discharged, and the junction between diode 74 and resistor 72 is also at substantially ground potential.

Should any AC voltage under these circumstances appear between the ring and ground conductors, and hence between conductors 38, 40, such voltage will, at most, cause the output of amplifier 28 to switch between about ground potential and about +12 volts. Thus, the situation at the noninverting input of amplifier 30 is such that this input will either be at substantially ground potential, or will be alternating between ground potential and +12 volts. Accordingly, there will not be a sufficiently positive voltage on the noninverting input of amplifier 30 to switch the voltage on the output of this amplifier above ground potential. So, as long as the telephone set remains in an off-hook condition, no AC voltage in the telephone line will be judged to be ringing voltage, since there is no circumstance under which the output of amplifier 30 can be switched above a ground potential.

With the telephone set in an on-hook condition, then about 50 volts will exist between conductors 34, 36, and the output of amplifier 26 will be at about +12 volts. This will result in charging of capacitor 80, with resultant placing on the noninverting input of amplifier 30 of a voltage of about +12 volts. In the absence of any AC voltage occurring in the telephone line, the output of amplifier 30 will remain at substantially ground potential.

Under circumstances of the telephone set being in an on-hook condition, and when ringing voltage occurs, amplifier 28 will provide alternating ground to +12 volt pulses on its output—these then being added to the +12 volts provided via amplifier 26 at the noninverting input of amplifier 30. It will be obvious that the sum of these voltages will exceed +18 volts, and as a consequence, the output of amplifier 30 will supply ground to +12 volt pulses. These latter pulses, initially, cause charging up of capacitor 90 which effects the delay mentioned earlier in the buildup of voltage at the noninverting input of amplifier 32.

After about the 0.3-second delay interval mentioned, the voltage at the noninverting input of amplifier 32 becomes sufficiently positive to switch the output of this amplifier from substantially ground potential to about +12 volts. Such switching provides a signal indicative of receipt of valid ringing voltage.

It should be recalled, of course, that with the telephone set in an on-hook condition, the only appreciable AC voltage which can exist between the ring and ground conductors is ringing voltage.

It will thus be apparent that an extremely simple and reliable circuit is provided for detecting the presence of ringing voltage in a telephone line. Through monitoring both the AC and the DC conditions in the line, distinguishing of such a voltage over other AC voltages is readily accomplished.

Were a two-wire rather than a three-wire connection to be used, the ring and ground conductors, and hence conductors 34, 40, would be connected together. An examination of the circuitry shown in the drawing will reveal that such a connection will in no way affect the performance of the detector which has just been described. With diodes 44, 46, 54, 56 provided as shown, it makes no difference what is the polarity of DC voltage between conductors 34, 36.

Thus, while a preferred embodiment of the invention has been described herein, it is appreciated that variations and modifications are possible and may be made without departing from the spirit of the invention.

It is claimed and desired to secure by letters patent:

1. Apparatus for detecting at the location of a subscriber's telephone set the presence of AC ringing voltage in a telephone line connected to the set, where the line includes conductors that will present such voltage with placement of a call to the set, as well as conductors wherein DC voltage of two different levels may exist at different times depending upon the on-hook or off-hook condition of the set, such DC voltage being larger than a certain voltage with the set in an on-hook condition, and less than said certain voltage with the set in an off-hook condition, said apparatus comprising an AC monitor circuit adapted for connection to those conductors in a telephone line which present AC ringing voltage, a DC monitor circuit adapted for connection to those conductors in a telephone line wherein DC voltage indicative of the on-hook/off-hook condition of a connected telephone set exists, a DC voltage level determiner operatively connected to said DC monitor circuit for determining whether the magnitude of DC voltage presented to the DC monitor circuit is above or below said certain voltage, a conjunction indicator operatively connected both to said AC monitor circuit and to said DC level determiner for indicating when, simultaneously, AC voltage appears at said AC, and said level determiner determines that voltage applied to said DC monitor circuit exceeds said certain voltage, and output means operatively connected to said conjunction determiner for producing an output signal reflecting the presence of ringing voltage in a line following indicating by said conjunction indicator of simultaneity of the type mentioned.

2. Apparatus for detecting at the location of a subscriber's telephone set the presence of AC ringing voltage in a telephone line connected to the set, where the line includes conductors that will present such voltage with placement of a call to the set, as well as conductors wherein DC voltage of two different levels may exist at different times depending upon the on-hook or off-hook condition of the set, such DC voltage being larger than a certain voltage with the set in an on-hook condition, and less than said certain voltage with the set in an off-hook condition, said apparatus comprising a DC monitor circuit adapted for connection to those conductors in a telephone line wherein DC voltage indicative of the on-hook/off-hook condition of a connected telephone set exists, a level determining circuit operatively connected to said DC monitor circuit for producing an indication of one type with voltage at said monitor circuit above said certain voltage, and an indication of another type with voltage at the DC monitor below said certain voltage, an AC monitor circuit adapted for connection to those conductors in a telephone line which present AC ringing voltage, a simultaneity circuit operatively connected both to said level determining circuit and to said AC monitor circuit for indicating the simultaneous existence of an indication of said one type by said level determining circuit along with AC voltage applied to said AC monitor circuit, and output means operatively connected to said simultaneity circuit for producing an output signal reflecting the presence of ringing voltage in a line following a simultaneity indication by the simultaneity circuit.

3. Apparatus for detecting at the location of a subscriber's telephone set the presence of AC ringing voltage in a telephone line connected to the set, where the line includes conductors that will present such voltage with placement of a call to the set, as well as conductors wherein DC voltage of two different levels may exist at different times depending upon the on-hook or off-hook condition of the set, such DC voltage being larger than a certain voltage with the set in an on-hook condition, and less than said certain voltage with the set in an off-hook condition, said apparatus comprising input means adapted for connection to the conductors in a telephone line, a DC voltage monitor operatively connected to said input means for producing an indication of a certain type with the level of DC voltage in those telephone line conductors wherein the magnitude of DC voltage is indicative of the on-hook/off-hook condition of a connected telephone set above said certain voltage, an AC voltage monitor operatively connected to said input means for producing an indication when AC exists in the telephone line, and a simultaneity circuit operatively connected to said DC and AC voltage monitors for indicating the simultaneous occurrence of an indication of said certain type from the former, and of an indication by the latter that AC exists in the telephone line.

* * * * *